US010024681B2

(12) United States Patent
Taylor et al.

(10) Patent No.: US 10,024,681 B2
(45) Date of Patent: Jul. 17, 2018

(54) TACTILE NAVIGATION SYSTEMS AND METHODS (71) Applicant: Wal-Mart Stores, Inc., Bentonville, AR (US)

(72) Inventors: Robert James Taylor, Bentonville, AR (US); Matthew Allen Jones, Bentonville, AR (US); Nicholaus Adam Jones, Fayetteville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 28 days.

(21) Appl. No.: 15/198,162

(22) Filed: Jun. 30, 2016

(65) Prior Publication Data
US 2017/0003139 A1 Jan. 5, 2017

Related U.S. Application Data (60) Provisional application No. 62/188,060, filed on Jul. 2, 2015.

(51) Int. Cl.
*G01C 21/36* (2006.01)
*G01C 21/20* (2006.01)
*G01C 21/26* (2006.01)
*A44C 5/00* (2006.01)
*A41F 9/00* (2006.01)

(52) U.S. Cl.
CPC ....... *G01C 21/3652* (2013.01); *G01C 21/206* (2013.01); *G01C 21/265* (2013.01); *G01C 21/3605* (2013.01); *A41F 9/00* (2013.01); *A44C 5/0015* (2013.01)

(58) Field of Classification Search
CPC .............. G01C 21/3652; G01C 21/206; G01C 21/265; G01C 21/3605; G01C 21/3647
See application file for complete search history.

(56) References Cited

U.S. PATENT DOCUMENTS 5,038,283 A * 8/1991 Caveney .............. B65G 1/1371
235/384
6,320,496 B1 11/2001 Sokoler et al.
(Continued)

FOREIGN PATENT DOCUMENTS

EP 2801840 A1 11/2014

OTHER PUBLICATIONS

Pielot, Martin, et al., "Pocket Navigator: Studying Tactile Navigation Systems In-Situ", CHI'12, May 5-10, 2012, Austin, Texas; 9 pages.
(Continued)

*Primary Examiner* — Dale Moyer
(74) *Attorney, Agent, or Firm* — Schmeiser, Olsen & Watts LLP (57) ABSTRACT

Provided is a wearable navigation device, comprising a band portion positioned at a portion of a human body; a location device that receives navigation data regarding a destination location for an item and determines a distance and orientation with respect to a current position of the wearable navigation device to the destination location; and a plurality of tactile feedback emitters that provide tactile feedback to the portion of the human body in a predetermined sequential order to direct a wearer of the band portion to the destination location having a point of intersection of a length, width, and height.

14 Claims, 7 Drawing Sheets

(56) References Cited

U.S. PATENT DOCUMENTS

| | | | |
|---|---|---|---|
| 6,618,683 B1* | 9/2003 | Berstis | G01C 21/165 340/10.1 |
| 7,243,024 B2 | 7/2007 | Endicott | |
| 7,788,032 B2 | 8/2010 | Moloney | |
| 7,991,576 B2 | 8/2011 | Roumeliotis | |
| 8,244,603 B1* | 8/2012 | Tang | G06Q 10/0633 414/222.07 |
| 9,202,353 B1* | 12/2015 | Sisbot | G06K 9/00335 |
| 9,451,674 B1* | 9/2016 | Kong | H05B 37/029 |
| 2003/0163394 A1* | 8/2003 | Munn | G06Q 10/087 705/28 |
| 2004/0140897 A1* | 7/2004 | Fabre | G06K 7/10336 340/572.8 |
| 2008/0120029 A1 | 5/2008 | Zelek et al. | |
| 2011/0268300 A1 | 11/2011 | DeMers et al. | |
| 2012/0166077 A1 | 6/2012 | Herzog et al. | |
| 2012/0270573 A1 | 10/2012 | Marti et al. | |
| 2013/0173151 A1* | 7/2013 | Freeman | G01C 21/343 701/466 |
| 2013/0173435 A1* | 7/2013 | Cozad, Jr. | G06Q 10/087 705/28 |
| 2013/0332273 A1 | 12/2013 | Gu et al. | |
| 2014/0019200 A1 | 1/2014 | Argue et al. | |
| 2014/0038139 A1 | 2/2014 | AlDossary | |
| 2014/0180582 A1 | 6/2014 | Pontarelli et al. | |
| 2016/0042440 A1* | 2/2016 | Francis | G06Q 10/0875 705/26.81 |
| 2016/0314512 A1* | 10/2016 | Kraft | G06Q 30/0627 |
| 2017/0116663 A1* | 4/2017 | Francis | G06Q 30/0635 |
| 2017/0202484 A1* | 7/2017 | Al-Shaery | A61B 5/1112 |

OTHER PUBLICATIONS

Mit, "New Wearable Tactile Displays to Measure Vibration Across the Skin", Popular Michanics.co.za, Jun. 19, 2013; 3 pages.

Combined Search and Examination Report in counterpart UK Patent Application No. 1611389.6, dated Dec. 13, 2016; 10 pages.

Examination Report in UK Patent Application No. GB1611389.6, dated Oct. 24, 2017; 4 pages.

\* cited by examiner

TACTILE NAVIGATION SYSTEMS AND METHODS

RELATED APPLICATION

This application claims priority to U.S. Provisional Patent Application Ser. No. 62/188,060, filed Jul. 2, 2015 and entitled "Tactile Navigation Systems and Methods", which is hereby incorporated entirely herein by reference.

FIELD

The present concepts relate generally to wearable navigation devices, and more specifically, to systems and methods for navigating a pedestrian to a location of interest at a store.

BACKGROUND

It is well-known that merchandise items are often difficult to locate in large stores, supermarkets, and the like. Locations within retail stores and the distances between the locations are often not well identified or mapped. Therefore, not only do customers have difficulty, but store employees also find it difficult to locate intended shelves, bins, or other storage regions for stocking items, or for performing inventory management or related job tasks.

BRIEF SUMMARY

In one aspect, a wearable navigation device, comprises a band portion positioned at a portion of a human body; a location device that receives navigation data regarding a destination location for an item and determines a distance and orientation with respect to a current position of the wearable navigation device to the destination location; and a plurality of tactile feedback emitters that provide tactile feedback to the portion of the human body in a predetermined sequential order to direct a wearer of the band portion to the destination location having a point of intersection of a length, width, and height.

In some embodiments, the band portion is in the form of a bracelet, anklet, or belt.

In some embodiments, the tactile feedback emitters generate at least one of vibration feedback, visual feedback, pressure feedback, or other haptic feedback.

In some embodiments, the tactile feedback emitters include a plurality of nodes, which each generates tactile feedback in a predetermined sequential order to direct the wearer of the band portion to the destination at a three-dimensional region of the location of interest.

In some embodiments, the tactile feedback emitters are constructed and arranged into a plurality of feedback zones.

In some embodiments, the nodes are constructed and arranged as a grid.

In some embodiments, the nodes create a tactile feedback in sequence across the nodes to direct the wearer in a vertical direction toward the location of interest.

In some embodiments, device further comprises a scanning device for scanning an element to determine a reference location, and wherein the feedback emitters provide a direction of the destination location from the reference location.

In some embodiments, the element includes another item on a shelf, an aisle-section tag, or an item shelf label.

In some embodiments the band portion includes multiple portions on different portions of the human body, and the tactile feedback emitters are positioned on each portion, and provide tactile feedback to the different portions of the human body.

In another aspect, a navigation system comprises a band portion positioned at a portion of a human body; a plurality of tactile feedback emitters that provide tactile feedback to the portion of the human body in a predetermined sequential order to direct a wearer of the band portion to the destination location; and a device that communicates with a mobile electronic device to receive from the mobile electronic device reference location information, wherein the feedback emitters provide a direction of the destination location from the reference location.

In another aspect, navigation system for identifying a location of interest of an item, comprises a wearable navigation device comprising a plurality of nodes positioned at a portion of a human body; at least one scanning device positioned at a current location for scanning an item to determine a location of interest of the item; a device at the current location that links to the wearable navigation device; and a plurality of tactile feedback emitters that provide tactile feedback to the portion of the human body in a predetermined sequential order to direct a wearer of the band portion to the location of interest.

In some embodiments, the device links to the wearable navigation device by a position system or a barcode on the wearable navigation device.

In some embodiments, the navigation system further comprises a location device that receives navigation data regarding a bin location of an item and determines a distance and orientation with respect to a current position of the wearable navigation device to the bin location.

In some embodiments, the location device generates signals to the wearable navigation device to direct a wearer to the bin location for picking the item, the bin location having a point of intersection of a length, width, and height.

In another aspect, a wearable navigation device comprises a band portion positioned at a portion of a human body; a location device that receives navigation data regarding a bin location of an item and determines a distance and orientation with respect to a current position of the wearable navigation device to the bin location; and a plurality of tactile feedback emitters that provide tactile feedback to the portion of the human body in a predetermined sequential order to direct a wearer of the band portion to the bin location for picking the item, the bin location having a point of intersection of a length, width, and height.

In another aspect, a wearable navigation device comprises a band portion positioned at a portion of a human body; a display at a user interface that displays a bin selection field for selecting a bin location for placing an item; a location device that receives navigation data regarding the bin location of an item and determines a distance and orientation with respect to a current position of the wearable navigation device to the bin location; and a plurality of tactile feedback emitters that provide tactile feedback to the portion of the human body in a predetermined sequential order to direct a wearer of the band portion to the bin location, the bin location having a point of intersection of a length, width, and height.

In another aspect, a method for navigation comprises: determining where to stock an item in possession of a user; scanning the item to establish an identity of the item; scanning a location-identifying element to establish a reference heading; determining a destination from the scanned item identity and reference heading; and directing the user to a location for stocking the item.

In another aspect, a method for navigation comprises removing an item from a bin; determining the bin; scanning a label at the bin; and directing the user to a location for the stocking the item from the bin.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In the following description, specific details are set forth although it should be appreciated by one of ordinary skill in the art that the systems and methods can be practiced without at least some of the details. In some instances, known features or processes are not described in detail so as to not obscure the present invention.

Embodiments of the present concepts include a system and method for improving productivity by store employees, associates, contractors, or the like, by providing instantaneous tactile feedback via a wearable navigation device to the wearer, which can direct the wearer to a destination of interest, example, a shelf, bin, and/or other storage location for stocking a store item.

Figure 1:
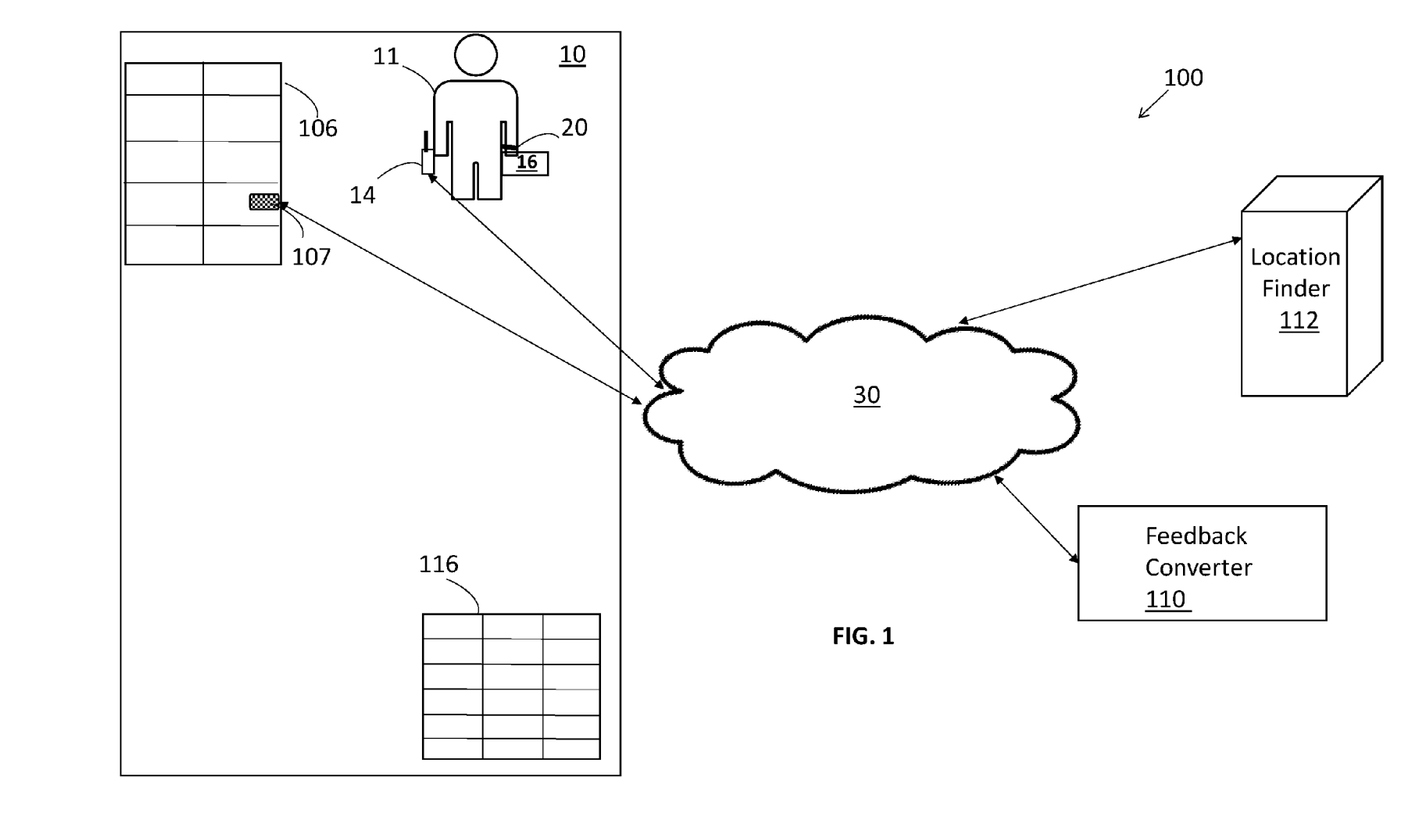
FIG. 1 is a diagram illustrating an environment for navigating an individual to a destination location for stocking an item at a store, in accordance with some embodiments.

FIG. 1 is a diagram illustrating an environment 100 for navigating an individual to a destination location for stocking an item at a store, in accordance with some embodiments. For example, an individual 11, or user, is in possession of one or more items 16 and wishes to bring the item 16 to a destination location 116 to stock the item 16 or otherwise move the item 16 to a desired location. Although item stocking is referred to in FIG. 1, other applications may equally apply where a user wishes to be directed to a destination location, not necessarily to stock an item.

The environment 100 includes a store 10, a network 30, a feedback converter 110, and a location finder 112. The store 10 may include a reference location 106 and the destination location, one or both of which may include a shelf, bin, freezer, and/or other structural element where store items may be stocked. In some embodiments, the feedback converter 110, location finder 112, store servers, and/or some or all of the network 30 may be physically present at the store 10. The store 10 may also include one or more servers (not shown) that perform well-known functions, for example, point of sale processing, inventory management, and so on. It is to be understood that the feedback converter 110, location finder 112, store server (not shown), and/or other computer systems of the environment 100 can take many forms and implementations, including hardware, software, or both. In embodiments where hardware implementations are present, the hardware processors can be part of one or more special purpose computers that execute computer program instructions which implement one or more functions and operations of the elements of the environment 100. Server 102 in the embodiment shown in FIG. 1 is a retail store server, but this is not meant to be limiting. Alternatively, features of the feedback converter 110, location finder 112, and/or store servers may be available via the internet, cloud computing services, or other remote server services.

A user 11 at the store 10 is in possession of a mobile electronic device 14 and a wearable navigation device 20. The mobile electronic device 14 and the navigation device 20 are each capable of exchanging wireless data with other hardware components of the environment, for example, the location finder 112, when the mobile computing device is located at a particular location. The mobile electronic device 14 can be a smartphone, handheld computer such as a tablet, or related device having a processor, memory, and display, and constructed and arranged for mobility, in particular, permitting the user 11, for example, an employee, to move about a store with the mobile electronic device 14.

Stored in the memory of the mobile electronic device 14 can include an application that processes data for pedometer locationing and for communicating with the wearable navigation device 20.

In other embodiments, the mobile electronic device 14 is not present, and the wearable device 20 is used to scan the item 16 and be directed to the destination location without involvement of the mobile device 14.

The navigation device 20 may be constructed and arranged for positioning about a wrist, waist, or other part of the body. The wearable navigation device 20 provides tactile feedback to the user 11, which may include sight, sound, vibration, or other haptic feedback for navigating the user 11 with the item 16 to a desired destination, for example, to a location of interest 116 for stocking the item 16. The location of interest 116 may have a length, width, and height. For example, the location of interest 116 may be a shelf that is six feet above ground level, and includes several shelves at different heights. Here, the wearable navigation device 20 provides tactile feedback that directs the user to the particular shelf six feet above ground level and distinguishes this shelf from the other shelves. For example, the information can be derived from available database information on modular-category-sequence (salesfloor) or aisle-section-height (backroom), or can be determined from scan data, for example, described herein.

Figure 2A:
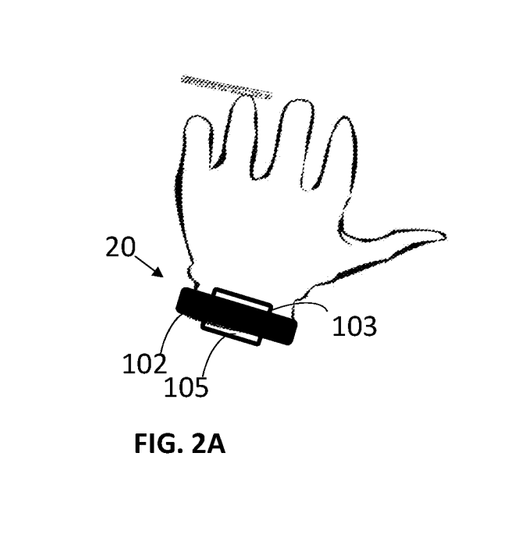
FIG. 2A is an enlarged view of the wearable navigation device of FIG. 1, in accordance with some embodiments.
Figure 2B:
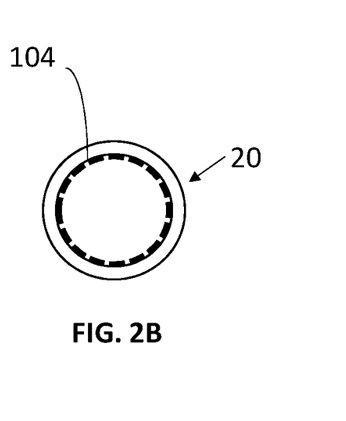
FIG. 2B is a top view of the wearable navigation device of FIGS. 1 and 2A.
Figure 2C:
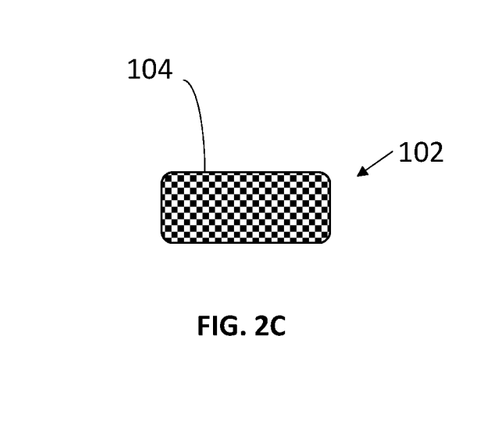
FIG. 2C is an enlarged view of a surface of the wearable navigation device of FIGS. 1, 2A, and 2B including a plurality of feedback devices.

As shown in FIGS. 2A-2C, the wearable navigation device 20 may include a band portion 102, barcode scanner 103, and a plurality of feedback devices 104, or nodes. The band portion 102 can be constructed and arranged for positioning about a body part, such as a wrist or waist. In other embodiments, the band portion 102 is flat, not ring-shaped, for attaching to a body portion such as the user's back or stomach region. In doing so, the feedback devices 104 on one side of the band portion 102 directly or nearly abuts the skin so that the skin can receive impulses or other sensory-related feedback, for example, heat, pressure, vibration, and so on, from a plurality feedback devices 104 at the band portion 102. The feedback devices 104 provide the pulses or other feedback in the form of sight, sound, and/or touch in a predetermined manner that indicates to the wearer 11 the direction of the destination location of interest 116, for example, generating pulses at a number of nodes 104 in a sequential pattern, or wave, or frequency. The nodes 104 can be positioned on multiple devices 20, for example, a device at each hip, each constructed and arranged to provide feedback according to embodiments herein.

The barcode scanner 103 is used for scanning a barcode or other location-identifying element 107 at a reference location 106 as well as the item 16 to determine the current location and orientation of the user 11, which in turn permits direction information to be generated and provided in the form of tactile feedback at the navigation device 20. Accordingly, the barcode scanner 103 may also be used to identify a desired location 116.

In some embodiments, the mobile electronic device 14 performs the scanning function instead of the wearable navigation device 20. Here, the wearable navigation device 20 communicates with the mobile device 14 to direct the user 11 to the destination location 116.

The wearable navigation device 20 may include at least one wireless transceiver 105 for communication with other electronic devices, for example, the feedback converter 110 and/or the mobile electronic device 14. The wireless transceiver 105 may exchange communication signals with the other electronic devices according to a communication protocol or type, such as, but not limited to, radio frequency (RF), WiFi, Bluetooth, and so on. In some embodiments, the navigation device 20 can communicate with the store server (not shown) for centralized location and direction processing for a dedicated or single-purpose location device.

When determining where to place the item 16 at its destination location 116, the user 11 may select at the mobile electronic device 14 the destination location 116. In particular, a display at the user interface of the electronic device 14 can display a button, window, via the software application, whereby the user 11 can enter the destination location 116 or selecting it from a dropdown menu. The selected location data can be output to the location finder 112 for processing.

The user 11 may scan the item 16 at or near the location 106 using the barcode scanner 103 to establish a current location. The item 16 that is scanned is the item that the user 11 needs to be directed to its location of interest. In doing so, the scan result can be output to the location finder 112. The location finder 112 determines that the barcode scan is generated by barcode scanner 103, and knows that the item 16 is at location 106. In other words, the known location 106 of the item 16 can be used to determine the direction for navigation for the user 11, which in turn can permit a path to be established from the current location to the intended location 116. Timestamps or related data can also be collected and processed by the location finder 112 to determine the location.

The user 11 may position the mobile electronic device 14 in a direction of, i.e., facing, the shelf 106 to determine a direction orientation. The wearable navigation device 20 may include an accelerometer or compass in some embodiments. In some embodiments, the user 11 scans a location-identifying element 107 such as an item, tag, shelf label, or the like at the shelf 106 to establish the location of the user 11 at the shelf 106 to establish a reference point, and to establish a reference heading or vector. In an embodiment where a compass is not used to determine heading, the heading will be assumed to be facing the shelf. The heading is needed to give directions accurately. The scan result can be output to the location finder 112. The location finder 112 can calculate a direction orientation of the user 11 based on the scan information provided from the scanner 103 and the location-identifying element 107 of the shelf 106 and provide the result to the wearable navigation device 20, for example, a location device or processor at the navigation device 20, which communicates with the tactile feedback emitters 104 to generate tactile feedback in response in a manner that permits the user to determine a general direction of the destination. For example, the tactile feedback can be generated as a wave-pattern by the feedback converter 110 based on the location information from the location finder 12. In some embodiments, the feedback was interpreted directly at the navigation device 20. For example, a signal corresponding to a "left turn" may be sent to the device 20 from the mobile device 14. In another example, a signal can be generated at a rate or frequency that increases as the user approaches the destination, for example, increasing pulses felt by the user's skin. In other embodiments, each node is controlled independently, for example, where the feedback converter 110 is located at a separate server.

Other embodiments may include, instead of a scanner on the mobile device 14 itself or the navigation device 20, a separate wired or wirelessly connected scanning unit may be used, for example, a ring-scanner or hip-mounted scanner, or other scanner at a different location than the mobile device 14 or navigation device 20.

Figure 3:
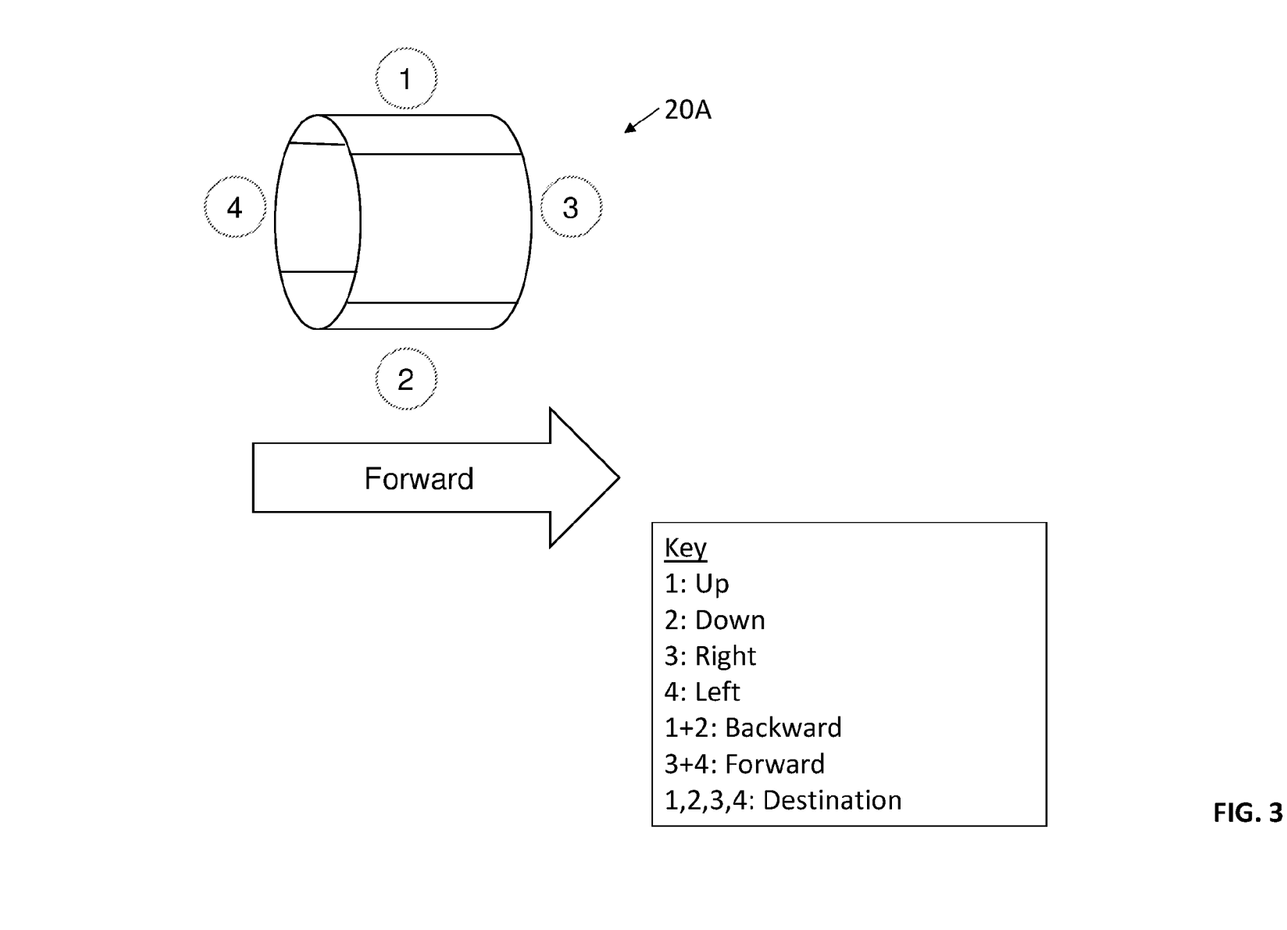
FIG. 3 is a diagram illustrating vibration feedback zones of a wearable navigation wrist band, in accordance with some embodiments.
Figure 4:
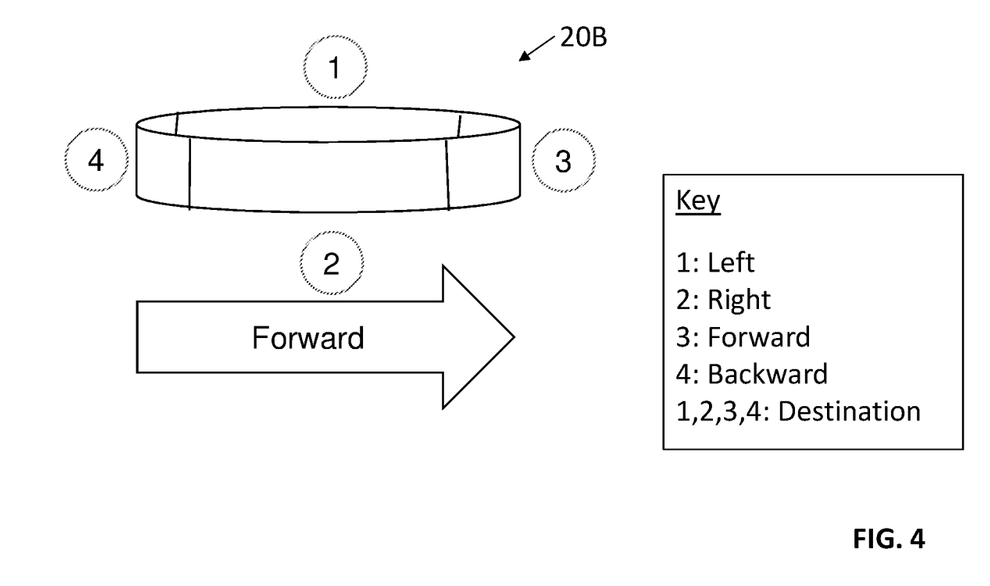
FIG. 4 is a diagram illustrating vibration feedback zones of a wearable navigation belt, in accordance with some embodiments.

As shown in FIG. 3, the wearable navigation device can be constructed as a wristband 20A, or as shown in FIG. 4, as a belt 20B. In some embodiments, the navigation device can be two or more devices located at different parts of the body, and each constructed and arranged to provide feedback via nodes 104. In some embodiments, the tactile feedback is generated as vibrations. For example, as described herein, nodes 104 are arranged so that the vibrations are provided in a sequential, or wave pattern, indicating three dimensional locations, e.g., left, right, forward, backward, up, down, or a combination thereof. In other embodiments, as shown in FIGS. 3 and 4, the wearable navigation device 20A, 20B (generally, 20) may include a plurality of feedback zones, for example, multiple vibration zones, pressure zones/nodes, or other tactile feedback, for example, gentle thermoelectric heating or cooling, for example, the device 20 is warmer in the direction that the wearer needs to go, and turns cooler away from where the user needs to go.

Figure 5:
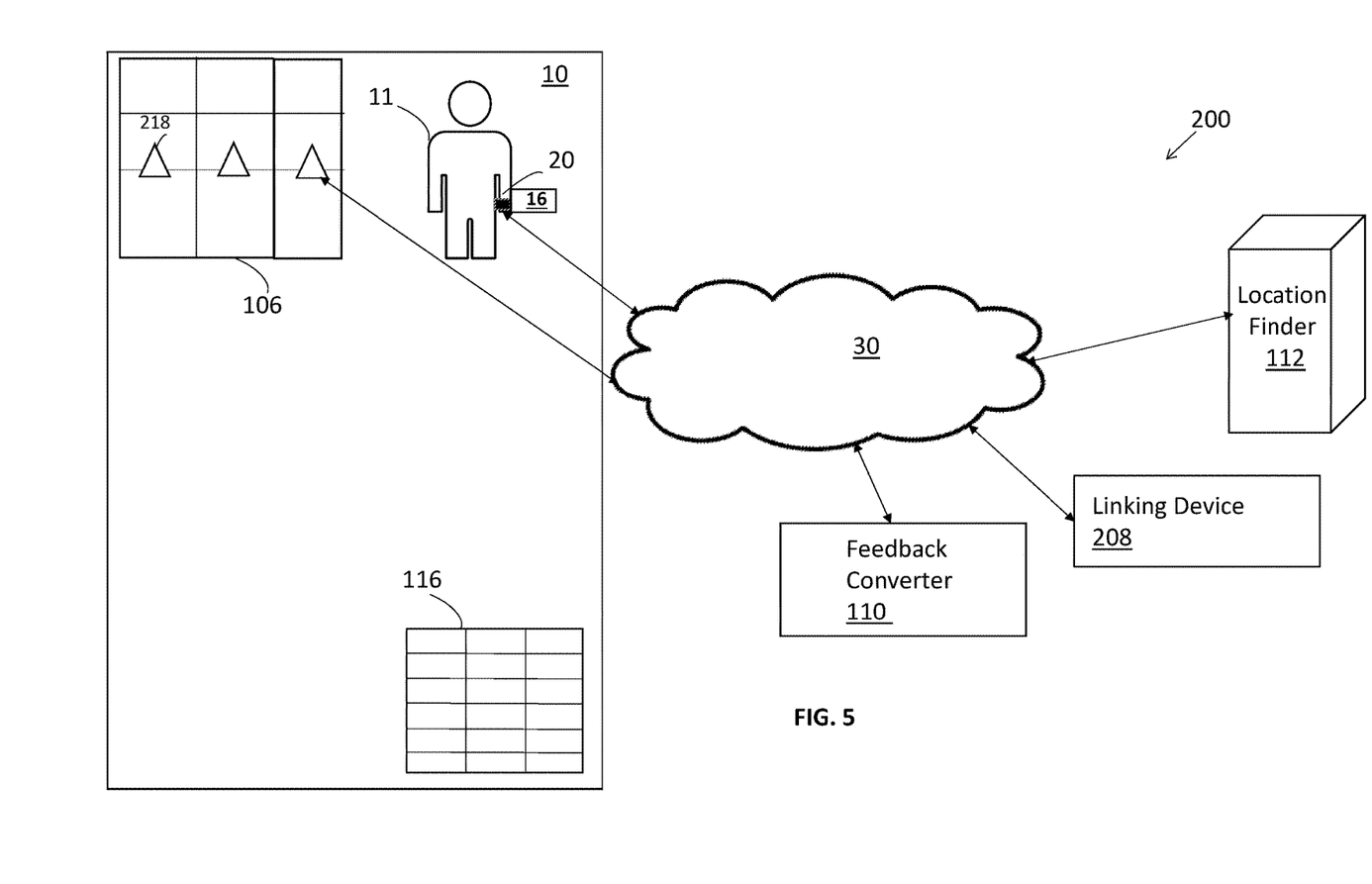
FIG. 5 is a diagram illustrating another environment for navigating an individual to a destination location, in accordance with some embodiments.

FIG. 5 is a diagram illustrating another environment 200 for navigating an individual to a destination location for stocking an item 16 at a store, in accordance with some embodiments. For example, a user 11 such as a store associate desires to bring an item 16 to a destination shelf 116.

The environment 200 includes a store 10, a network 30, a converter 110, and a location finder 112, which may be similar or the same of those described in FIG. 1. Details thereof will therefore not be repeated due to brevity.

Instead of a scanner located on the wearable navigation device 20, the environment 200 includes a plurality of stationary scanning devices 218 at a reference location 106, which can determine an orientation of the user 11. Each scanning device 218 serves as a predetermined location node, which is mapped to or otherwise associated with a particular store location such as an aisle, shelf, and so on. Therefore, unlike the environment of FIG. 1, there is no need to establish a relative location using a scanner on the wearable navigation device 20. Instead, the relative locations, and directions to those locations, are already established by the fixed location of the scanners 218. A mobile electronic device is not required to communicate with the scanning device 218. However, the scanning device 218 may communicate directly with the wearable navigation device 20, or indirectly via a server or the like. The user 11 may scan the item 16 using a scanner 218 at a location node to establish a current location of the user 11. The location node can be assigned to an aisle-section or other predetermined or "fixed" location, so that the location is established, and that the current location of the user 11 and item 16 are known. Since the location is fixed, the orientation of the user 11 is known. Also, the navigation device 20 at the scanning hub 218 can be identified by scanning a barcode on the navigation device 20, via wireless communication, and/or other identification techniques. In some cases, only one navigation device 20 is present at the store. Here, the navigation device 20 does not require a specific identifier for determining navigation information. After scanning the item 16, the navigation device 20 may include a sync button or the like that outputs a signal to the server 112 when selected, which instructs the server 112 to output navigation to the navigation device 20, as distinguished from other navigation devices which may be present at the store 10.

The location data, item and navigation device identifiers can be output to the location finder 112, or related server, whereby an association, or link, can established between the fixed scanner 218 and the wearable navigation device 20. In some embodiments, the linking device 208 links the user 11, or more specifically, the wearable navigation device 20 in possession by the user 11, to the selected location node automatically based on the nearest WiFi, Bluetooth, or other connection. Here, Wi-Fi triangulation, GPS, or other related techniques may be used to locate which wearable device 20 is nearby (for example, when many users are involved with moving items).

The location finder 112 can calculate from the data provided by the fixed scanner 218 direction signals, i.e., navigation information, that guide the user 11 from the fixed scanner 218 to the destination location 116. The location finder 112 can send the direction data to the wearable device 20, which in response can provide tactile feedback for navigating the user 11 to the destination 116. Navigation may occur by the location finder 112 having a set of instructions, which along with a compass or accelerometer at the wearable device 20, and tracking the movements, for example, turns, made by the user 11 during movement to the destination location 116. In other embodiments, the wearable device 20 can include a position sensor, for example, GPS, WiFi, and so on, which can provide data to the location finder 112 which in turn continuously tracks the user's movements and provides direction information.

The wearable navigation device 20 can generate tactile feedback in a similar manner as described in the environment 100 of FIGS. 1-4.

Figure 6:
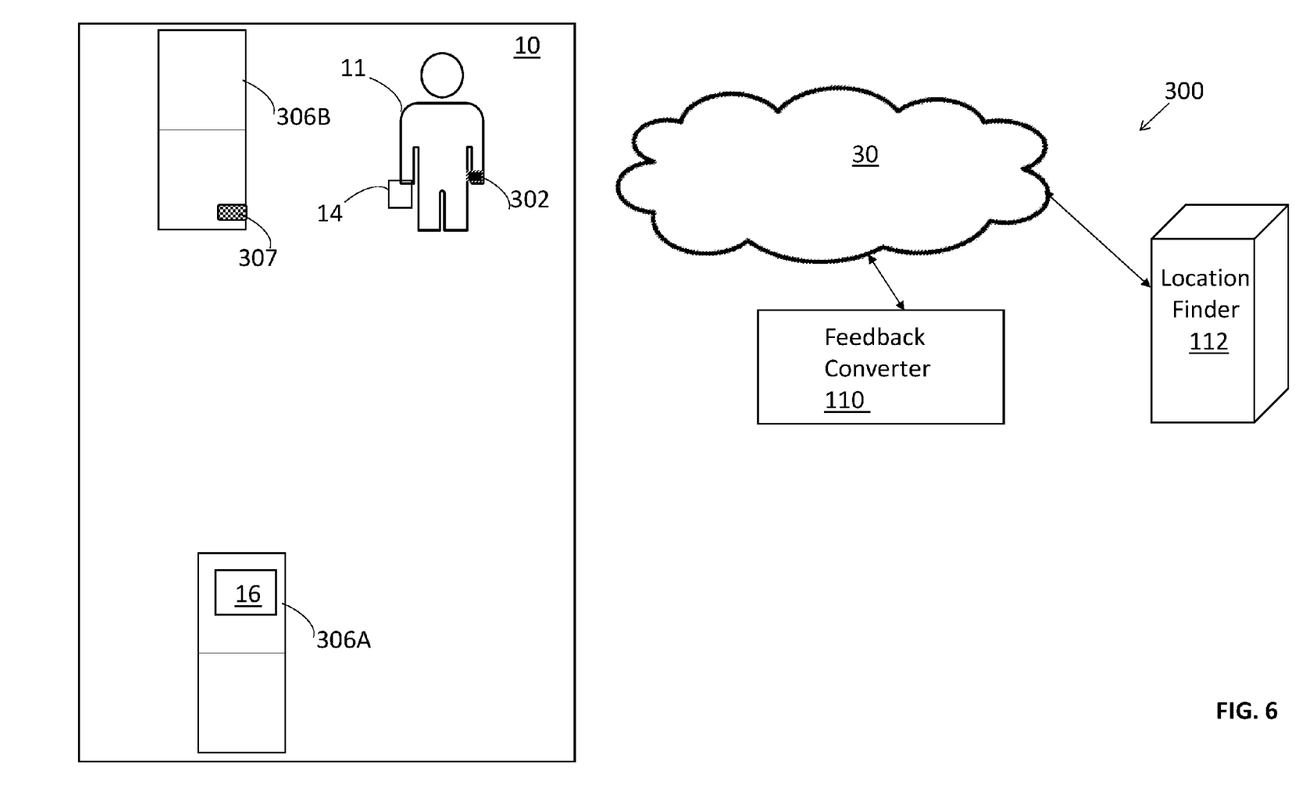
FIG. 6 is a diagram illustrating another environment for navigating an individual to a destination location, in accordance with some embodiments.

FIG. 6 is a diagram illustrating another environment 300 for navigating an individual 11 to a destination location for stocking an item at a store, in accordance with some embodiments. Here, a user may wish to remove an item from a bin 306A, for example, in a pick, where the individual 11, or user wearing a navigation device 302. Bin locations 306A, B (generally, 306) may be stacked vertically, horizontally, or both, for example, configured as an array. Although a bin is referred to in the example of FIG. 6, other locations may equally apply, for example, store shelves.

The user 11 may select at the mobile electronic device 14 a bin location where the user would like to put item 16. In other embodiments, the user 11 can select the item 16 which may have an intended location associated with it. A display at the user interface of the electronic device 14 can graphically present a button, window, via a software application stored in memory and executed by a processor. Here the user 11 can select a bin location, bin 306A. In some embodiments, a sales floor may have multiple locations for the same item 16. Bins, shelves, or a combination thereof may therefore be selected. The bin location is displayed may include an identity of an aisle, section, height/notch, or other location. The selection information can be output to the location finder 112. The item and bin location are associated with each other, or linked, by a unique identifier stored at the location finder 112, or a database in communication with the location finder 112.

User 11 establishes a reference direction by facing a reference bin 306B, and establishes a current location by scanning bin label 307 (either with barcode scanner 103 or scanner on phone 14) which establishes user's current location and orientation.

The location finder 112 can determine direction data based on the received information for directing the user to the intended bin location 306A and sends result to a location device 302 on wristband.

Tactile feedback can be provided from the navigation device 302. For example, the tactile feedback can be generated by the feedback converter 110 in response to location information from the location finder 112. Since a location may be established, in three dimensions, for example including along a vertical axis, tactile feedback can be provided that informs the user 11 of the vertical location, for example, by vibrations at zones 1 and 2 shown in FIG. 3 corresponding to an up direction and a down direction, respectively. In other embodiments, referring to FIGS. 2A and 2C, wave patterns or other tactile feedback can be generated that indicate an up direction or a down direction. The tactile feedback may therefore direct the user 11 to the bin 306A location for removing item 16 from bin 306A.

Figure 7:
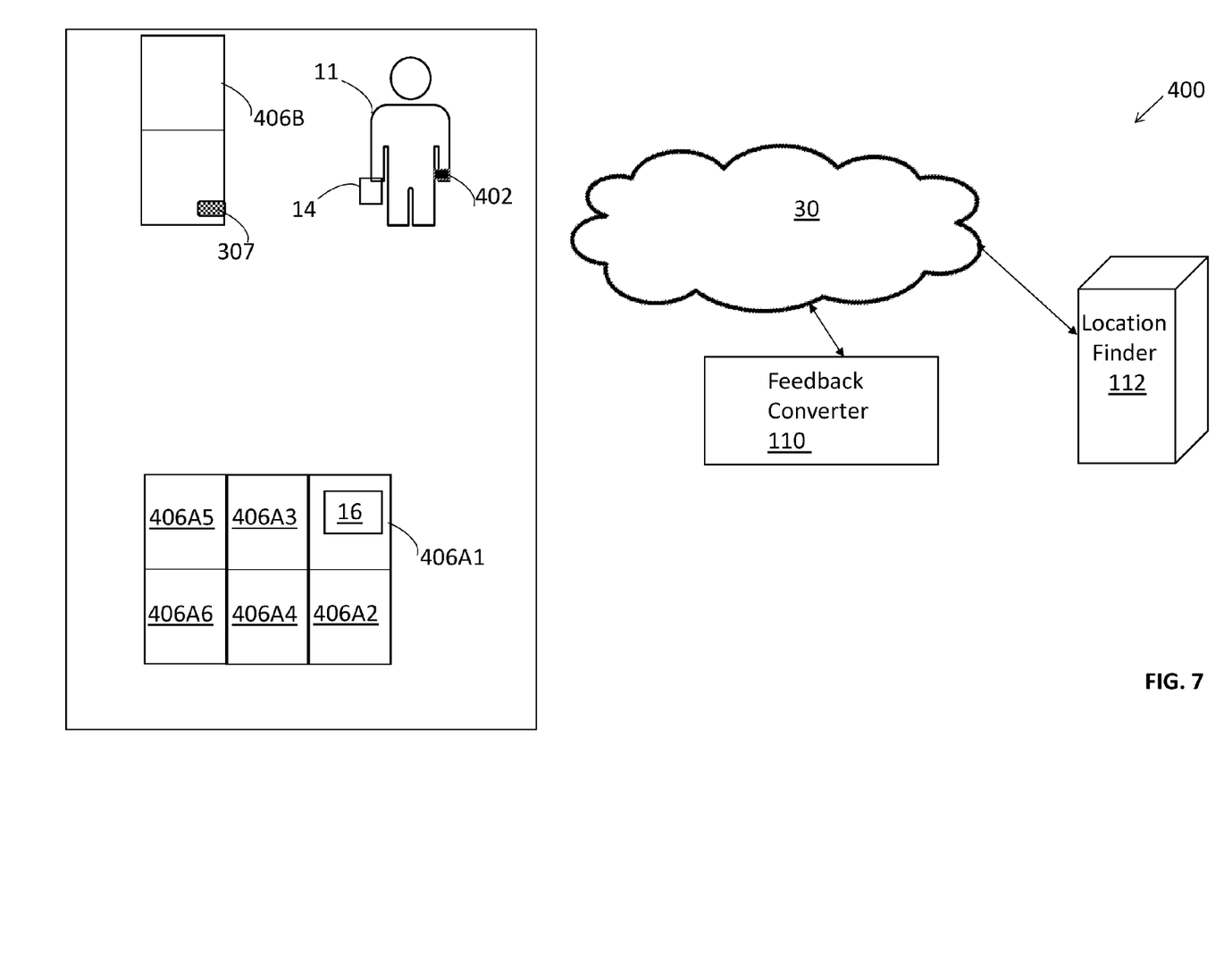
FIG. 7 is a diagram illustrating another environment for navigating an individual to a destination location, in accordance with some embodiments.

FIG. 7 is a diagram illustrating another environment 400 for navigating an individual to a destination location, in accordance with some embodiments.

The user 11 may select at the mobile electronic device 14 a bin location where the user would like to put item 16. Although bin locations are referred to in FIG. 7, other locations may equally apply, for example, shelves. The user 11 may select at the mobile electronic device 14 a location where the user would like to put item 16, for example, a bin, shelf, or both. In other embodiments, the user 11 can select the item 16 which may be assigned to multiple locations, for example, assigned to one or more bins 406A1-406A6. In other embodiments, a sales floor may have multiple locations for the same item. Here, a selection of locations may include one or more bins, shelves, and/or the like. A display at the user interface of the electronic device 14 can graphically present a button, window, via a software application stored in memory and executed by a processor. Here the user 11 can select a bin location, bin 406A1. The selection information can be output to the location finder 112. The item and bin location are associated with each other, or linked, by a unique identifier stored at the location finder 112, or a database in communication with the location finder 112.

User 11 establishes a reference direction by facing a reference bin 306B, and establishes a current location by scanning bin label 307 (either with barcode scanner 103 or scanner on phone 14) which establishes user's current location and orientation.

Location finder 112 determines a closest or most easily accessible bin based on a technique that processes aisle/rack/height information and determines a direction to that location and sends result to the navigation device 402 via the converter 110. The tactile feedback emitters 104 at the navigation device 402 may provide tactile feedback, for example, according to feedback zones described above, to direct the wearer 11 to a region of intersection at a length, width, and height of the location of the bin 406A1.

Tactile feedback can be provided from the navigation device 402 in a similar manner as the navigation device 302 of FIG. 6. For example, the tactile feedback can be generated by the feedback converter 110 in response to location information from the location finder 112.

As will be appreciated by one skilled in the art, concepts may be embodied as a device, system, method, or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Computer program code for carrying out operations for the concepts may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Concepts are described herein with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While concepts have been shown and described with reference to specific preferred embodiments, it should be understood by those skilled in the art that various changes in form and detail may be made therein without departing from the spirit and scope as defined by the following claims.

What is claimed is:

1. A wearable navigation device, comprising:
a band portion positioned at a portion of a human body;
a location device that receives navigation data regarding a location of interest that includes a shelf of a plurality of shelves holding an item, and the location device determines a distance and orientation with respect to a current position of the wearable navigation device to the location of interest; and
a plurality of feedback emitters that provide haptic feedback to the portion of the human body in a predetermined sequential order to direct a wearer of the band portion to the location of interest where a length, width, and height of the shelf intersect.

2. The device of claim 1, wherein the band portion is in the form of a bracelet, anklet, or belt.

3. The device of claim 1, wherein the feedback emitters generate at least one of tactile feedback, vibration feedback or pressure feedback.

4. The device of claim 1, wherein the feedback emitters include a plurality of nodes, which each generates tactile feedback in a predetermined sequential order to direct the wearer of the band portion at a three-dimensional region of the shelf location.

5. The device of claim 1, wherein the feedback emitters are constructed and arranged into a plurality of feedback zones.

6. The device of claim 4, wherein the nodes are constructed and arranged as a grid.

7. The device of claim 4, wherein the nodes create a tactile feedback in sequence across the nodes to direct the wearer in a vertical direction toward the shelf location.

8. The device of claim 1, further comprising a scanning device for scanning an element to determine a reference location, and wherein the feedback emitters provide a direction of the shelf location from the reference location.

9. The device of claim 8, wherein the element includes a location-identifying item on a shelf, an aisle-section tag, or an item shelf label at the reference location.

10. The device of claim 1, wherein the band portion includes multiple portions on different portions of the human body, and wherein the feedback emitters are positioned on each portion, and provide tactile feedback to the different portions of the human body.

11. A navigation system for identifying a location of interest of an item, comprising:
   at least one scanning device positioned at a current location for scanning an item to determine a location of interest of the item;
   a device at the current location that links to a wearable navigation device; and
   a plurality of feedback emitters that provide haptic feedback to the portion of the human body in a predetermined sequential order to direct a wearer of the wearable navigation device to the location of interest, and further comprising:
   a location device that receives navigation data regarding a bin location at the location of interest of the item and determines a distance and orientation with respect to a current position of the wearable navigation device to the bin location.

12. The navigation system of claim 11, wherein the device at the current location links to the wearable navigation device by a position system or a barcode on the wearable navigation device.

13. The navigation system of claim 11, wherein the location device generates signals to the wearable navigation device to direct a wearer to the bin location for picking the item, the bin location having a length, width, and height.

14. A method for navigation, comprising:
   determining where at a location of interest to stock an item in a user's possession;
   scanning at a current location the item to establish an identity of the item;
   linking a device at the current location to a wearable navigation device of the user;
   scanning a location-identifying element to establish a reference heading;
   determining a destination from the scanned item identity and reference heading and further determining a distance and orientation with respect to a current position at the current location of the wearable navigation device to the location of interest where a length, width, and height of a bin or shelf location at the location of interest intersect by receiving navigation data from a location device regarding the bin or shelf location at the location of interest and further determining a distance and orientation with respect to a current position of the wearable navigation device to the bin or shelf location; and
   directing the user to the bin or shelf location for stocking the item.

* * * * *